Figure 1:
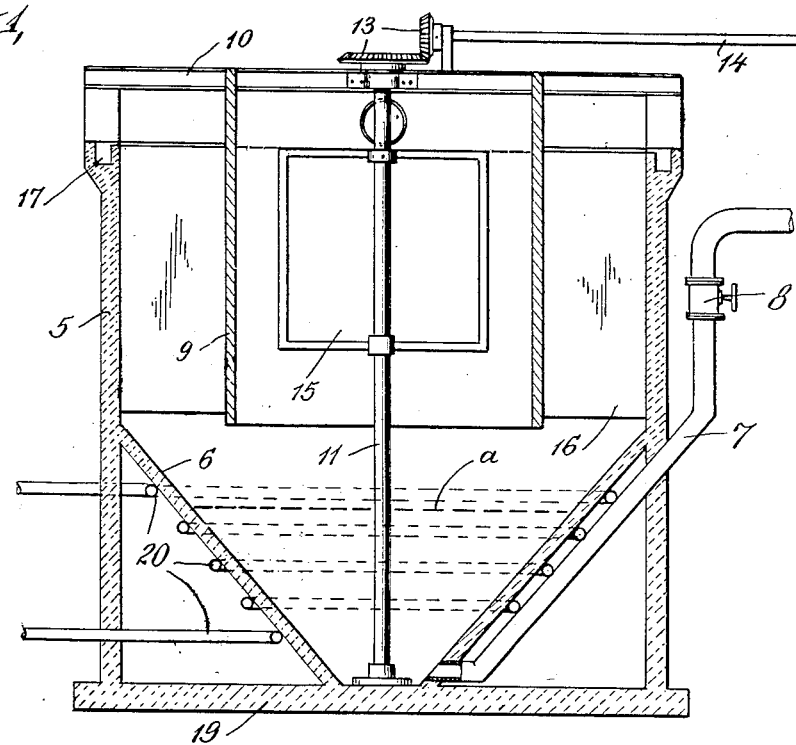

W. R. BORST.
SEWAGE TREATMENT.
APPLICATION FILED JULY 28, 1920.

1,396,397.

Patented Nov. 8, 1921.

Inventor
Warren R. Borst
By his Attorneys
Pennie, Davis, Marvin & Edmonds

UNITED STATES PATENT OFFICE.

WARREN R. BORST, OF WEST BRIGHTON, STATEN ISLAND, NEW YORK.

SEWAGE TREATMENT.

1,396,397.  Specification of Letters Patent.  Patented Nov. 8, 1921.

Application filed July 28, 1920. Serial No. 399,464.

*To all whom it may concern:*

Be it known that I, WARREN R. BORST, a citizen of the United States, residing at 97 Taylor street, West Brighton, Staten Island, in the county of Richmond, State of New York, have invented certain new and useful Improvements in Sewage Treatment; and I do hereby declare the following to be a full, clear, and exact description of the invention, such as will enable others skilled in the art to which it appertains to make and use the same.

This invention relates to sewage treatment, and has for its object the provision of an improved method of and apparatus for treating sewage.

Domestic or municipal sewage contains varying amounts of putrescible organic matter which, if not appropriately removed from the sewage before it is discharged into the sea, rivers, or the like, decomposes and thereby becomes an offensive nuisance that may even amount to a danger to public health. Moreover, this decomposition or putrefaction of organic matter in sewage is an economical waste since the organic matter, if appropriately recovered from the sewage before putrefaction, has a marketable value. Furthermore, the discharge into rivers or streams of putrescible organic matter pollutes these waters and frequently renders them unfit for the existence of aquatic animal life or for various domestic and industrial uses for which the unpolluted waters are naturally adapted. For these reasons, it is not only desirable, but in many cases necessary, that such putrescible organic matter be removed from the sewage or otherwise rendered innocuous and inoffensive before the sewage is finally disposed of.

Various methods have heretofore been proposed for the removal of putrescible organic matter from sewage, such as screening, sedimentation, biological action, etc. In removing putrescible organic matter from sewage by sedimentation, the organic matter settles by gravity from the sewage liquor which is maintained for this purpose in a relatively quiescent condition. The putrescible organic matter settles in the form generally known as sludge. This sludge, or the raw sewage without preliminary sedimentation, is frequently subjected to biological action in the course of which it is acted upon by appropriate bacteria of which there are in general two kinds, aerobic bacteria and anaerobic bacteria. Aerobic bacteria require the presence of free oxygen to become active, while anaerobic bacteria are not active in the presence of free oxygen.

The anaerobic bacteria are employed in sewage treatment for the purpose of reducing the amount of sludge by decomposition and putrefaction of the organic matter. As the result of this biological action there is produced what is generally known in the art as digested sludge.

The aerobic bacteria require the presence of free oxygen for their existence and growth and are employed in sewage treatment for the purpose of oxidizing the organic matter. This biological action produces what is generally known in the art as activated sludge.

In these biological processes of sewage treatment, biological growths or bacteria are thus made use of for converting the putrescible organic matter in the sewage into a composition of innocuous and unoffensive character and of a physical condition permitting its ready removal from the sewage.

The present invention is concerned solely with those processes of sewage treatment in which the biological action for clarifying or purifying the sewage is brought about by aerobic bacteria.

Where the biological treatment or clarification of the sewage is brought about by the action of aerobic bacteria, the presence of free oxygen in the sewage in sufficient amount to assure the desired activity of the bacteria must be provided. In the heretofore customary activated sludge process of sewage treatment, this result is effected pneumatically by introducing compressed air in a finely disseminated state into the bottom of the body of sewage undergoing treatment. The air rises through the sewage in the form of bubbles and by its agitating and aerating action creates within the sewage appropriate conditions with respect to the presence and distribution of free oxygen for the existence, growth and propagation of the aerobic bacteria.

I have found that the requisite amount of free oxygen for securing the desired activity of aerobic bacteria can be economically and effectively introduced into a body of sewage at the top surface thereof. To this end, I have found that it is only necessary to appropriately disturb the top surface of the body of sewage in contact with atmospheric air, for example, by the production of waves or by mechanically produced agitation. In general, I have found that any disturbance of the top surface of the sewage causes oxygen to pass downward into the sewage, and the amount of oxygen passing downward depends upon the disturbance at the surface. When the disturbance of the surface is adequate, the oxygen passing downward within the sewage is sufficient to provide within the sewage the requisite amount of free oxygen for the growth, development and propagation of the aerobic bacteria.

Thus, in accordance with my present invention, free oxygen preferably in the form of atmospheric air, for the development of the aerobic bacteria is introduced into the sewage at or near the top thereof, and as a result of the very rapid diffusion downwardly of the oxygen so introduced, there is maintained throughout the entire body of sewage undergoing treatment a uniform distribution of free oxygen in sufficient amount to assure the desired activity of the aerobic bacteria. For the purposes of the invention, air may be satisfactorily introduced into the sewage by agitating or otherwise appropriately disturbing the top surface thereof. As the biological action proceeds with the aid of aerobic bacteria in the presence of free oxygen, the sewage becomes depleted to a greater or less extent in free oxygen and the disturbance of the top surface, contemplated by the invention, is such that the air thus absorbed by or introduced into the sewage at or near the top surface thereof rapidly diffuses downwardly through the sewage, and as a result of this rapid downward diffusion of the air, there is provided throughout the entire body of sewage a sufficient amount of free oxygen for the desired biological action.

The rapidity of the rate of diffusion of the air downwardly through the sewage is remarkable. For practical purposes, I find that this rate of downward diffusion of the air is substantially instantaneous, so that as long as the surface of the sewage in contact with atmospheric air is maintained in a condition capable of absorbing such air, there will be provided, solely by absorption and diffusion, throughout the entire body of sewage undergoing treatment, a sufficient amount of free oxygen for the active and effective development of the aerobic growths.

In confirmation of the aforestated principles, I have studied the rate and amount of oxygen absorbed by sewage from fresh and salt water when contained in open rectangular tanks 25 feet long, 6 feet wide and 6 feet deep. Waves of about 4 inches in height were produced by the vertical reciprocating action of a horizontally disposed slat at right angles to the length of the tank and located at 12½ feet from the ends of the tank. This slat was in contact with the upper part of the sewage in the tank and was vertically reciprocated by appropriate motive means. As a result of the agitation produced in the sewage by the reciprocatory movement of the slat, I found that oxygen was absorbed by or introduced into the body of the sewage and that the diffusion of this oxygen in the sewage was practically instantaneous throughout the six-foot depth of the tank until the whole body was completely saturated with oxygen. This oxygen, of course, came from the atmospheric air which was in effect whipped into the sewage by the agitation produced by the reciprocating slat.

From my investigations, I have accordingly found that when a body of sewage, in contact at its top surface with atmospheric air, is continuously agitated by any means, the body of liquor absorbs air (and hence oxygen) until it becomes saturated therewith. Under such conditions, the aerobic growths readily develop and become active in consuming the organic matter in the sewage, whereby the liquid becomes stable and the organic matter is converted into a biological growth generally known in the art as activated sludge. By the heretofore customary practice of treating sewage by the activated sludge process, compressed air is introduced into the bottom of the body of sewage undergoing treatment, usually through a porous medium covering compressed air compartments in the bottom of the treatment tank. I have found that the same biological action, as in the heretofore customary activated sludge practice, can be brought about without the use of compressed air, and without the introduction of free oxygen into the bottom of the body of sewage, by mechanically effecting an introduction into the sewage at or near the top thereof of air by absorption or by a beating in action.

Figure 2:
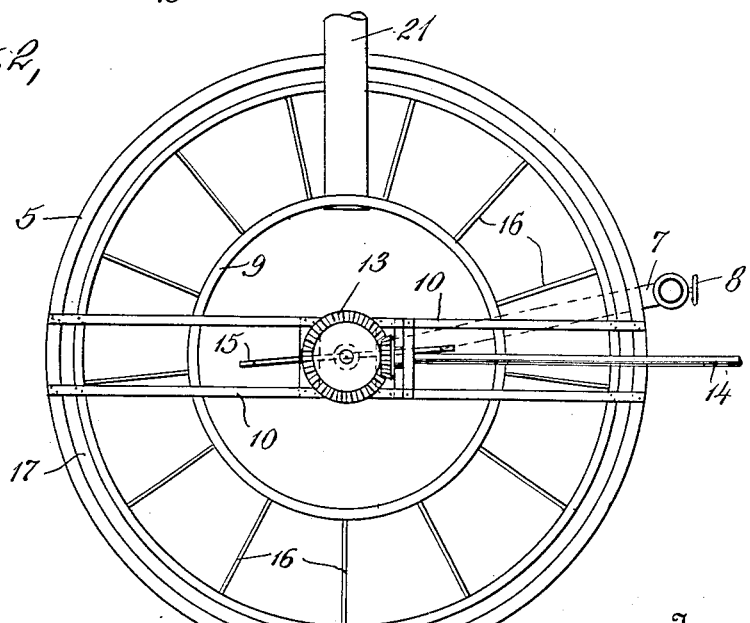

A practical application to sewage treatment of the aforementioned principles underlying the present invention will be understood from the following description taken in conjunction with the accompanying drawing, in which:

Figure 1 is a sectional elevation of an apparatus particularly adapted for carrying out the method of the invention; and Fig. 2 is a top plan of the same apparatus.

The apparatus illustrated in the accompanying drawing comprises a circular tank 5 which may advantageously be built of concrete, or other appropriate material. The bottom portion 6 of the tank is conical, and the slope of this conical bottom is preferably such as to insure the progressive travel downwardly of the biological sludge resulting from the treatment of the sewage in the digesting compartment of the tank. If desired, the slope of the conical bottom of the tank may be made flatter and mechanical stirring or rabbling means may be employed for working settleable solid matter toward the sludge discharge outlet. A pipe 7 communicates with the interior of the conically shaped portion 6 near the bottom thereof and serves for withdrawing sludge from this portion of the tank. Preferably, the withdrawal of sludge is effected by the hydrostatic head of the liquid in the tank, and the rate of withdrawal of sludge is controlled by a valve 8.

A cylindrical drum 9 is arranged in the upper part of the tank 5 and is supported by beams 10 mounted on the top of the tank. A vertical shaft 11 is rotatably mounted in the tank 5 and is adapted to be rotated at appropriate speed by bevel gears 13 and a power shaft 14. The shaft 11 carries a two-blade agitator 15 which is arranged within the drum 9.

The annular compartment between the drum 9 and the cylindrical wall of the tank 5 is provided with a plurality of vertical baffles or partitions 16 which extend from the top of the tank 5 downwardly to within a short distance of the bottom of the drum 9. The top of the tank 5 is provided with a peripheral overflow launder 17 having an outlet 18.

The cylindrical side wall of the tank 5 preferably extends straight to the bottom of the conical portion 6, and the tank may be built upon a concrete foundation or base 19. The space between the conical portion 6 and the lower cylindrical wall of the tank 5 may be provided with heating means, such, for example, as a heating coil 20 for maintaining the sewage in the tank 5, during cold weather, at an appropriate temperature for securing the development and activity of the bacteria. Ordinarily, the conical portion 6 of the tank will be made of concrete, or of the same material that the tank 5 is built of. However, when the heating coils 20 are provided the conical portion 6 should be constructed of good heat-conducting material, for example, metal appropriately protected on the inside from such corroding action as the sewage might cause.

In operation, the raw sewage is fed into the tank through a sewage inlet pipe 21 communicating with the interior of the drum 9. The height of the liquor within the drum 9 is preferably maintained at such a level as to provide a sufficient hydrostatic head for effecting the withdrawal of the sludge from the bottom of the tank as well as the overflow of effluent into the peripheral launder 17. The shaft 10 is rotated at a sufficiently high speed to produce a vigorous agitation of the sewage within the drum 9. As a result of this agitation atmospheric air is introduced into the sewage and rapidly diffuses downwardly therethrough. The interior of the drum 9 thus forms in effect an aerating and digesting or oxidizing compartment or zone in which air is introduced at or near the top of the sewage therein, and in which biological clarification of the sewage takes place.

Upon flowing downwardly beyond the lower end of the drum 9, the biologically treated sewage is subjected to sedimentation and decantation, principally in the compartments formed in the annular space between the drum 9 and the cylindrical wall of the tank 5. The transverse baffles 16 prevent swirling of the sewage and insure a relatively quiescent condition conducive to sedimentation and decantation. A substantially clear and stable effluent overflows into the launder 17 and may be appropriately disposed of. The biological growths or sludge settle toward the bottom of the conical portion 6 and, in operation, there is maintained in this portion of the tank an accumulation of biological sludge to about the level indicated in Fig. 1 of the drawing by the dotted line a.

From the foregoing description, it will be seen that the apparatus illustrated in the accompanying drawing comprises a centrally disposed aerating and oxidizing compartment in which aeration is effected by atmospheric air absorbed by or beaten into the sewage by mechanical agitation, and oxidation of the organic matter in the sewage is brought about by the action of the aerobic bacteria. I have found that rotary agitation in the aerating compartment is very satisfactory for this purpose. The aerating and oxidizing compartment is surrounded by an annular quiescent area or zone which is divided into separate compartments by radial baffles and in which sedimentation and decantation take place. Without the radial baffles, I find that there is a swirling movement of the liquor which interferes with satisfactory sedimentation and decantation. The raw sewage is fed into the aerating and oxidizing compartment where it is vigorously agitated and thereby maintained saturated with air. This air provides sufficient free oxygen for the growth, development and propagation of the aerobic bacteria and assures the necessary activity of these bacteria for effecting the desired clarification or purification of the sewage.

Raw sewage directly from the sewer outfalls may be introduced into the aerating and oxidizing compartment. Generally, however, it is desirable to subject the raw sewage to a rough screening operation, for example, by means of a bar screen in which the bars are spaced about 2 inches apart, in order to remove from the sewage unusually bulky material.

The air introduced at or near the top surface of the sewage in the aerating and digesting compartment rapidly diffuses downwardly throughout the body of sewage undergoing biological treatment, and by the mechanical agitation described the sewage throughout its entire depth is maintained practically saturated with air. This air is obtained and introduced into the sewage more economically than in the heretofore customary practice of the activated sludge process, and the distribution of the air is as uniform and generally more uniform than in the case of such prior practice. The method of the invention moreover results in a material decrease in cost of installation and operation of equipment for treating sewage by the activated sludge process, as compared with the prior practice.

I claim:

1. The method of treating sewage which comprises subjecting a body of sewage to biological action with the aid of aerobic bacteria in the presence of free oxygen, and maintaining the presence of free oxygen throughout the entire body of said sewage by diffusion downwardly through the sewage of air introduced by agitation at or near the top surface of said body of sewage.

2. The method of treating sewage which comprises subjecting a body of sewage to biological action with the aid of aerobic bacteria in the presence of free oxygen, and maintaining the presence of free oxygen within the sewage by artificially disturbing the surface of the body of sewage undergoing treatment in such a manner as to be continually in motion.

3. The method of treating sewage which comprises subjecting a body of sewage to biological action with the aid of aerobic bacteria in the presence of free oxygen, and maintaining the presence of free oxygen throughout the entire body of said sewage by diffusion downwardly through the sewage of air introduced at or near the top surface of said body of sewage by artificially disturbing the sewage.

4. The method of treating sewage which comprises subjecting the sewage to biological action with the aid of aerobic bacteria in the presence of free oxygen, and maintaining within the sewage the required amount of free oxygen for the development of said bacteria by absorption of air at or near the top surface of the sewage and diffusion of such air downwardly through the sewage.

5. The method of treating sewage which comprises subjecting the sewage to biological action with the aid of aerobic bacteria in the presence of free oxygen, and mechanically agitating the sewage so as to thereby effect the introduction of atmospheric air at or near the top surface of the sewage and the diffusion of such air downwardly through the sewage.

6. The method of treating sewage which comprises subjecting the sewage to biological action with the aid of aerobic bacteria in the presence of free oxygen, and artificially disturbing the top surface of the sewage in contact with atmospheric air whereby air is introduced into the sewage at or near the top surface thereof and diffuses downwardly through the sewage.

7. The method of treating sewage which comprises subjecting the sewage to biological action with the aid of aerobic bacteria in the presence of free oxygen, and mechanically agitating the sewage so as to keep the surface thereof in contact with atmospheric air in constant motion whereby air is introduced into the sewage at or near the surface and diffuses downwardly through the sewage thereby providing throughout the sewage the presence of the required amount of free oxygen for the development of said bacteria.

8. The method of treating sewage which comprises maintaining within an appropriate container an aerating zone in which the sewage is subjected to biological action with the aid of aerobic bacteria in the presence of free oxygen, maintaining within said aerating zone an accumulation of biological sludge resulting from said biological action, and maintaining above said accumulation of biological sludge and surrounding said aerating zone a settling area.

9. The method of treating sewage which comprises maintaining within an appropriate container an aerating zone in which the sewage is subjected to biological action with the aid of aerobic bacteria in the presence of free oxygen, maintaining below said aerating zone an accumulation of biological sludge resulting from said biological action, maintaining above said accumulation of biological sludge and surrounding said aerating zone a settling area, and introducing air into the sewage in the aerating zone at or near the top thereof for providing within the sewage in this zone the required amount of free oxygen for the development of said bacteria.

10. The method of treating sewage which comprises maintaining within an appropriate container an aerating zone in which the sewage is subjected to biological action with the aid of aerobic bacteria in the presence of free oxygen, maintaining below said aerating zone an accumulation of biological sludge resulting from said biological action, and mechanically agitating the sewage in the aerating zone for introducing into the sewage the required amount of free oxygen for the development of said bacteria.

11. The method of treating sewage which comprises maintaining within an appropriate container an aerating zone in which the sewage is subjected to biological action with the aid of aerobic bacteria in the presence of free oxygen, maintaining below said aerating zone an accumulation of biological sludge resulting from said biological action, and artificially disturbing the top surface of the sewage in said aerating zone so as to keep such surface in constant motion whereby atmospheric air is introduced into the sewage at or near the top of the aerating zone and diffuses downwardly through the sewage.

12. The method of treating sewage which comprises maintaining within an appropriate container an aerating zone in which the sewage is subjected to biological action with the aid of aerobic bacteria in the presence of free oxygen, maintaining below said aerating zone an accumulation of biological sludge resulting from said biological action, maintaining above said accumulation of biological sludge and surrounding said aerating zone a sedimentation and decantation area, introducing raw sewage into said aerating zone, withdrawing biological sludge from said accumulation thereof, and withdrawing from said area by decantation a practically clear effluent.

13. The method of treating sewage which comprises maintaining within an appropriate container an aerating zone in which the sewage is subjected to biological action with the aid of aerobic bacteria in the presence of free oxygen, maintaining below said aerating zone an accumulation of biological sludge resulting from said biological action, maintaining above said accumulation of biological sludge and surrounding said aerating zone a sedimentation and decantation area, introducing raw sewage into said aerating zone, introducing at or near the top of the sewage in the aerating zone atmospheric air for providing within the sewage in this zone the required amount of free oxygen for the development of said bacteria, withdrawing biological sludge from said accumulation thereof, and withdrawing from said area by decantation a practically clear effluent.

14. The method of treating sewage which comprises maintaining within an appropriate container an aerating zone in which the sewage is subjected to biological action with the aid of aerobic bacteria in the presence of free oxygen, maintaining below said aerating zone an accumulation of biological sludge resulting from said biological action, maintaining above said accumulation of biological sludge and surrounding said aerating zone a settling area, and applying heat to the sewage in the vicinity of said accumulation of biological sludge for maintaining an appropriate temperature for the activity of said bacteria.

15. The method of treating sewage which comprises maintaining within an appropriate container an aerating zone in which the sewage is subjected to biological action with the aid of aerobic bacteria in the presence of free oxygen, mechanically agitating the sewage in the aerating zone for introducing into the sewage the required amount of free oxygen for the development of said bacteria, maintaining below said aerating zone and in communication therewith an accumulation of biological sludge resulting from said biological action, and maintaining a quiescent settling zone surrounding said aerating zone and in communication with the bottom thereof and also in communication with said accumulation of biological sludge.

16. The method of treating sewage which comprises maintaining within an appropriate container an aerating zone in which the sewage is subjected to biological action with the aid of aerobic bacteria in the presence of free oxygen, subjecting the sewage in the aerating zone to mechanical rotary agitation for introducing into the sewage the required amount of free oxygen for the development of said bacteria, maintaining below said aerating zone and in communication therewith an accumulation of biological sludge resulting from said biological action, maintaining a settling area surrounding said aerating zone and in communication with the bottom thereof and also in communication with said accumulation of biological sludge, and preventing swirling of the sewage in said settling area as a consequence of the rotary agitation in said aerating zone.

17. An apparatus for treating sewage comprising a container having a central aerating compartment, a sludge-collecting compartment below said aerating compartment and in communication therewith, and a sedimentation and decantation compartment above said sludge-collecting compartment and surrounding said aerating compartment.

18. An apparatus for treating sewage comprising a container having a central aerating compartment, agitating means operatively mounted in said aerating compartment, a sludge-collecting compartment below said aerating compartment and in communication therewith, and a sedimentation and decantation compartment above said sludge-collecting compartment and surrounding said aerating compartment.

19. An apparatus for treating sewage comprising a container having a central aerating compartment, rotary agitating means operatively mounted in said aerating compartment, a sludge-collecting compartment below said aerating compartment and in communication therewith, and a sedimentation and decantation compartment above said sludge-collecting compartment and surrounding said aerating compartment.

20. An apparatus for treating sewage comprising a container having a central aerating compartment, rotary agitating means operatively mounted in said aerating compartment, a sludge-collecting compartment below said aerating compartment and in communication therewith, a sedimentation and decantation compartment above said sludge-collecting compartment and surrounding said aerating compartment, and means for preventing swirling of the sewage in the sedimentation and decantation compartment surrounding said aerating compartment as a consequence of the rotary agitation therein.

21. An apparatus for treating sewage comprising a container having a central aerating compartment, rotary agitating means operatively mounted in said aerating compartment, a sludge-collecting compartment below said aerating compartment and in communication therewith, a sedimentation and decantation compartment above said sludge-collecting compartment and surrounding said aerating compartment, and radially positioned baffles in said sedimentation and decantation compartment surrounding said aerating compartment for preventing swirling of the sewage undergoing sedimentation and decantation.

22. An apparatus for treating sewage comprising a container having a central aerating compartment, a sludge-collecting compartment below said aerating compartment and in communication therewith, a sedimentation and decantation compartment above said sludge-collecting compartment and surrounding said aerating compartment, and heating means operatively associated with said container for heating the sewage in the lower part thereof.

In testimony whereof I affix my signature.

WARREN R. BORST.